United States Patent [19]

Hostettler

[11] 4,065,003

[45] Dec. 27, 1977

[54] RAISABLE AND LOWERABLE MAT-LOADING AND PRESS-TRAY UNLOADING DEVICE FOR A MULTI-LEVER PRESS

[75] Inventor: Werner Hostettler, Zurich, Switzerland

[73] Assignee: Peter Fahrni, Zurich, Switzerland

[21] Appl. No.: 678,229

[22] Filed: Apr. 19, 1976

[30] Foreign Application Priority Data

Apr. 28, 1975 Switzerland ........................ 5447/75

[51] Int. Cl.$^2$ ................................................ B65G 1/04

[52] U.S. Cl. .................................... 214/16.6; 100/196

[58] Field of Search ....................... 100/196; 214/16.6; 425/455 R

[56] References Cited

U.S. PATENT DOCUMENTS

| | | | |
|---|---|---|---|
| 2,534,325 | 12/1950 | Way | 100/196 |
| 2,831,213 | 4/1958 | Klarmann et al. | 214/16.6 |
| 2,883,033 | 4/1959 | Armstrong et al. | 214/16.6 |
| 3,077,271 | 2/1963 | Siempelkamp | 214/16.6 |
| 3,791,538 | 2/1974 | Greenberger | 214/16.6 |

*Primary Examiner*—Lawrence J. Oresky
*Attorney, Agent, or Firm*—Anthony J. Casella

[57] ABSTRACT

A mat loading and press-tray unloading apparatus for a multi-level press having a plurality of plates for the manufacture of boards includes a raisable and lowerable structure. A set of loading and unloading levels are connected to the raisable and lowerable structure, each set corresponding in number to the number of press levels. The loading and unloading levels are arranged such that at one end of the structure at least two loading levels are directly adjacent to each other, at the other end of the structure at least two unloading levels are directly adjacent to each other, and at an intermediate portion of the structure at least one unloading level is disposed between two loading levels. The apparatus also includes means for raising and lowering the structure, and means for feeding the levels.

7 Claims, 14 Drawing Figures

Figure 1:
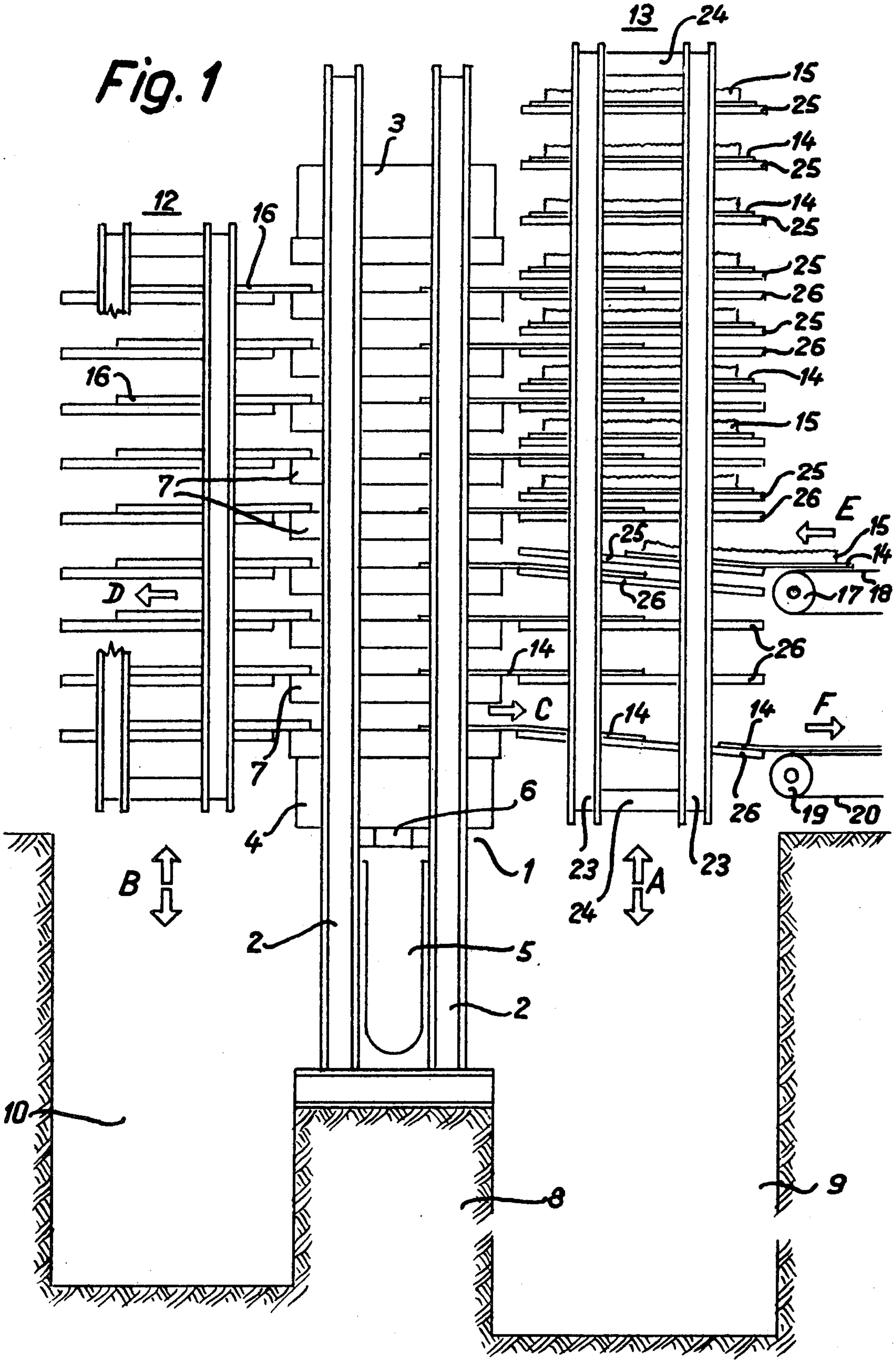

RAISABLE AND LOWERABLE MAT-LOADING AND PRESS-TRAY UNLOADING DEVICE FOR A MULTI-LEVER PRESS

The object of the present invention is a raisable and lowerable mat-loading and press-tray unloading device for a multi-level press for the manufacture of boards, which has a number of loading levels corresponding to the number of press levels for the simultaneous loading of all press levels with mats resting on press trays and an equal number of unloading levels for the simultaneous removal of the press trays from the press.

Customarily in the removing of the press trays from the press there are concerned press trays which have already been freed from the said presses. The boards are separated in these cases from the press trays in the press and removed on the other side of the press.

Installations in which the press trays are not conducted through the press are generally referred to as single-strand systems since the conveyance paths for the transportation of the mats to the loading device and the return thereof to the forming station lie above each other or possibly coincide.

The apparatus in accordance with the invention can be used, for instance, in combination with single-strand plants for the production of single-layer or multi-layer boards of wood chips, fibers or the like which have been treated with binders.

Apparatus of the aforementioned type have been used since a long time for loading hot presses with cauls on which mats made up of wood chips lie, and for removing the press trays freed from the pressed particle boards from the press.

In the case of the press loading and unloading devices which have been known up to the present time and are used in combination with multi-level presses, a set of loading levels is located over each set of unloading levels, the number of levels of each set corresponding to the number of levels of the normally heated press.

One basic disadvantage of such devices resides in their large structural height and the corresponding large amount of vertical space required. Such loading and unloading cages require a deep pit for the lowering, and furthermore require a large amount of free space towards the top so that the cage can be lowered to the desired depth and raised to the required height. In practice, presses for single-strand plants, because of this, have not more than 8 to 9 levels. When caul transport paths which lie one above the other are provided, the two conveyance paths then lie a large distance apart since there is necessarily a spacing greater than the difference from the lowest heating plate to the highest when the press is open. The high position of the upper conveyor path is furthermore also disadvantageous as is, finally, the slow operation of the plant. These time delays are due on the one hand, to the long paths of movement of the loading and unloading devices or the cage of the device and, on the other hand, to the fact that it is impossible even during the loading and unloading cycle of the press, to feed a press tray loaded with a mat and at the same time remove a tray from the apparatus.

Small installations having a press with, for instance, two or three levels and feed and removal transportation paths lying at the same level also exhibit specific defects. In particular the large reciprocating movement and the space required for this are disturbing. Thus, it is necessary in such small plants to arrange the forming station at a relatively large distance from the apparatus so that they do not interfere with each other, while in the case of a plant built in accordance with the principle of the present invention, it may even be possible to arrange some of the machine parts required for the spreading of the mats above the unloading and loading devices.

The object of the present invention is to create an apparatus of the aforementioned type in which the difficulties described no longer are present. In accordance with the invention, this goal is achieved by arranging loading and unloading levels interspersed in such a manner one above the other, that at least one unloading level is present between every two loading levels.

As a result of this development, which is based on the discovery that the two sets of levels instead of being arranged, one above the other as in the traditional solutions, interengage to a more or less pronounced extent, the overall height of the cage can be considerably reduced, as a result of which the apparatus becomes more compact and accordingly cheaper.

The shortened stroke paths contribute to saving energy and thus to greater economy. In principle, a total interspersing of the loading and unloading levels of the apparatus is possible if the conveyance path of the loaded trays to the apparatus lies on the same level as the conveyance path for the removal of the trays from the apparatus. On the other hand, in an apparatus having conveyor lines which lie one above the other and therefore separately, the degree of interspersing is determined, on the one hand, by the distance between the levels of the opened press and, on the other hand, by the minimum distance or vertical space requirement between the two conveyor strands leading to and from the apparatus. At least three, and at most however five, unloading levels are advisedly arranged below the lowermost loading level in an apparatus which is intended to load and unload a multi-level press. An equal number of loading levels are then provided above the top unloading level. The number of intermediate interspersed levels of both types, in principle combined in pairs, is limited merely by considerations of space and depends, furthermore, on the number of levels of the press.

Specifically the surprising fact that with the greatest possible interspersing the distance between the two superimposed conveyor paths is a minimum is important, since, in this way, it is possible to arrange both strands at a low level and greatly to improve their accessibility.

Several illustrative examples of the invention and their manner of operation are described below, with reference to the drawings in which:

FIGS. 1 to 4 show schematically an apparatus in accordance with the invention in combination with nine-level press which is to be loaded and unloaded, each of these figures showing the apparatus in a different phase of operation;

FIGS. 5 to 10 show similar diagrammatic views of a plant having a two-level press, a loading and unloading device, and a forming station having two spreading places, a single conveyor path being provided for the transportation of the loaded and unloaded press trays; and FIGS. 11 to 14 show four horizontal sections, corresponding to each other, through loading and unloading devices, multi-level press and board removal cage, shown in different phases of operation which explain, inter alia, the removal of the pressed boards from the press.

The plant in accordance with FIGS. 1 to 4 comprises a press, designated 1, which is heated in customary manner, and nine press levels to be loaded and unloaded. On two vertical frames 2 there are seated, fixed in position, an upper spar 3 and a hydraulic pressure cylinder 5 whose piston 6 serves to lift the lower spar 4 as well as the movably arranged press plates 7. The press 1 is mounted on a foundation base 8. Both on the the entrance side and on the outlet side of the press there is a pit, 9 and 10 respectively. These pits make it possible to lower the loading and unloading device 13 and the board removal cage 12. The vertical possibilities of movement of these devices are indicated by the arrows A and B.

The apparatus 13 serves to introduce the press trays 14, loaded with particle-board mats 15, into the press and bring them to such heights that all levels of the press can be loaded in a single operation. Furthermore the apparatus 13 has the task of simultaneously taking over the trays 14 which have been freed from the pressed boards 16 in the press after the pressing process. It is assumed here that, as trays 14, metal cauls are used and that on these metal cauls a mat of a limited amount of glue-treated wood chips of selected type has been spread in a forming plant, not shown in the drawing. The mats 15 may consist of one or more layers. The board removal cage 12 is shown only in FIGS. 1 and 11 to 14. It operates independently of the apparatus 13 in accordance with the invention and has not been described in detail.

The loaded cauls 14 are fed to the apparatus 13 by means of an intermittently driven conveyor belt 18, the direction of which is reversed at 17. This conveyor belt takes over the loaded trays 14 from another continuously driven conveyor means which extends over all spreading stations. Depending on the specific circumstances, a different means of conveyance may be selected instead of the belt 18, for instance a chain conveyor or the like. Directly below the conveyance path described, there is another conveyor device, also intermittently driven, consisting of a reversing roller 19, a conveyor belt 20 or a conveyor chain, and other means, not shown. This conveyor strand takes over the still-warm cauls 14 brought out of the press 1 by means of the apparatus 13 and conducts them back to the forming station, which does not form part of the present invention.

The drive means for the raising and lowering of the cage of the apparatus 13 has not been shown on the drawing. The cage which is also referred to technically as a basket consists essentially of a double frame 23, with connecting arms 24, nine loading levels 25 and nine unloading levels 26. By the expression "level" there is meant here, in each case a flat resting means, which may consist of one or more parts and serves for the supporting of a loaded or unloaded caul. Thus, two sets of levels are distributed in each case at equal distances apart and with levels fastened to the frame 23.

In the phase illustrated in FIG. 1, the press trays which have been freed from the completely pressed particle boards 16 are fed simultaneously onto the discharge levels 26 (arrow C). At the same time the pressed boards 16 move into the cage 12 (arrow D). Furthermore, the last caul 14 loaded with a mat 15 is brought onto the lowermost loading level of the cage 13 (arrow E). Finally, another process takes place during the course of this phase, namely the moving away of the last metal caul of the preceding load (lowermost unloading level, arrow F).

In the press tray unloading position of the cage or basket 13 shown in FIG. 1, the lowermost levels of each set of levels is tilted slightly downward on one side so that the right-hand edge of the lowermost loading level comes to lie at the level of the conveyor belt 18 and the right-hand edge of the lowermost unloading level comes to lie at the level of the conveyor belt 20. This slight swinging can be affected by a motor-driven cam or a cylinder actuated by a fluid.

Figure 2:
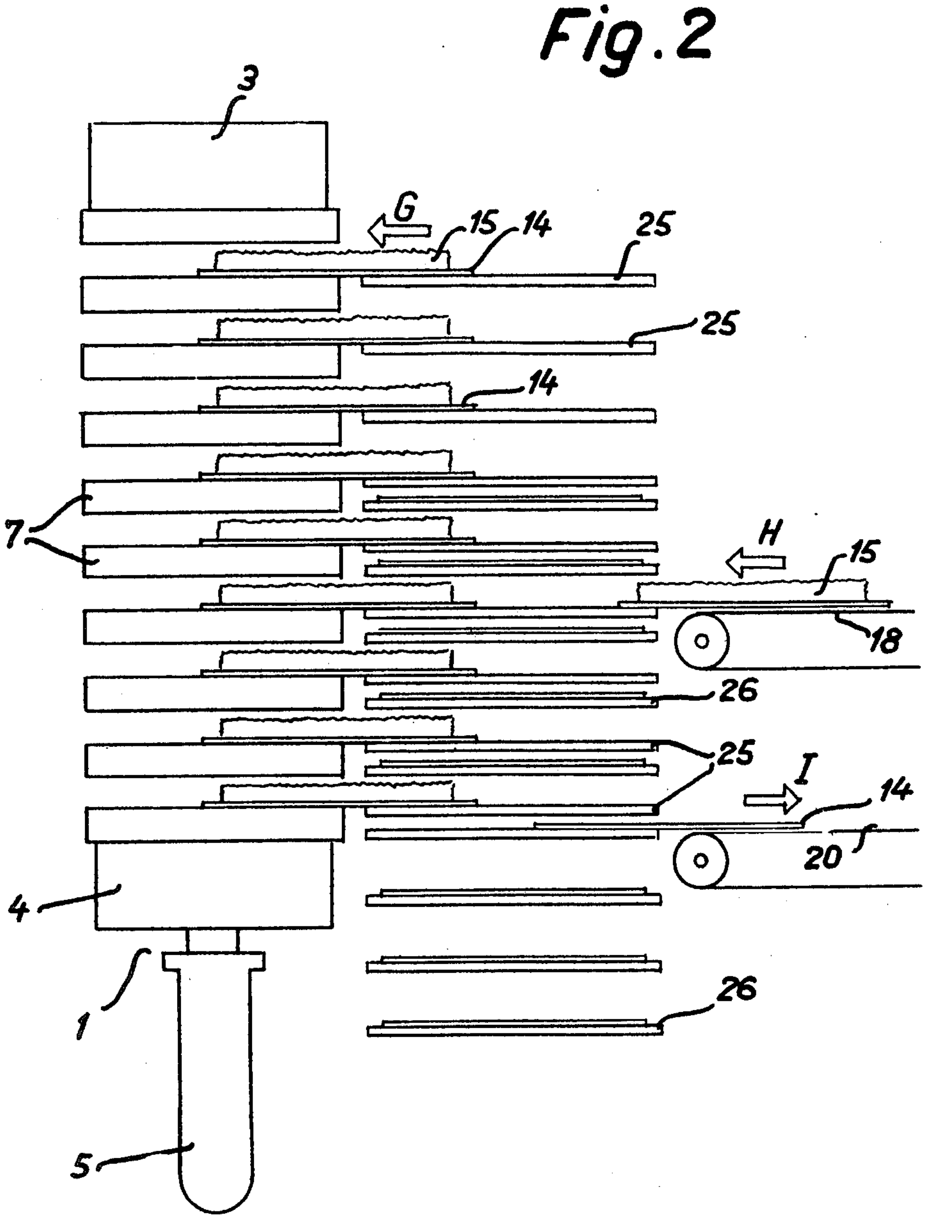

After completion of the phase described, the entire device 13 is lowered into the loading position shown in FIG. 2. This involves a vertical displacement which corresponds to the distance between the upper courses of the conveyor belts 18 and 20. The upper surfaces of the loading levels 25 are now at the same height as the upper press surfaces of the heated press plate. At the moment shown in FIG. 2, the cauls 14 loaded with mats 15 are pushed into the press (arrow G). At the same time, the first loaded tray of the newly to be formed loading batch is introduced into a sixth loading level (from above) (arrow H). During this phase, the first unloaded caul 14 of the preceding unloading batch is furthermore conducted out of the apparatus 13 and transported back by means of the conveyor belt 20 (arrow I).

Figure 3:
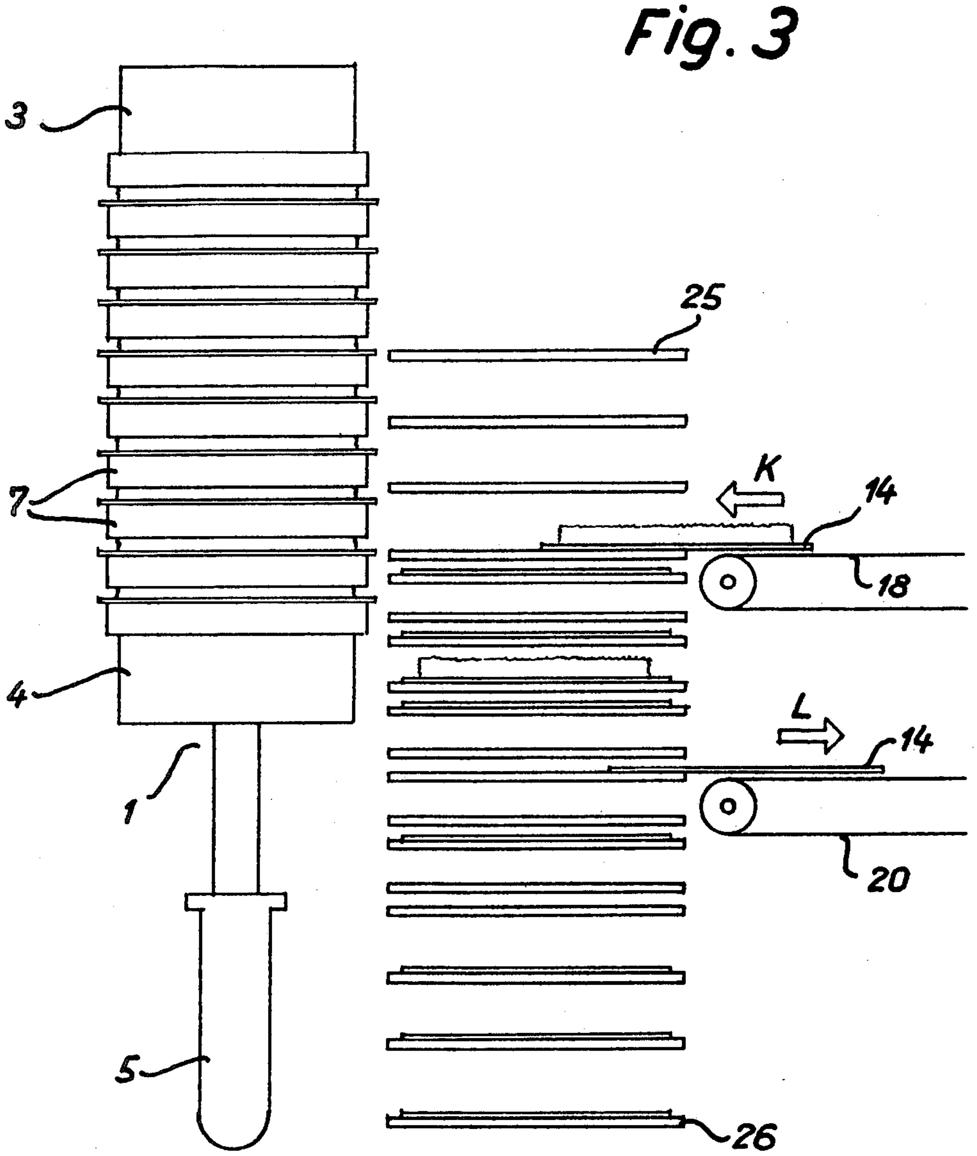
Figure 4:
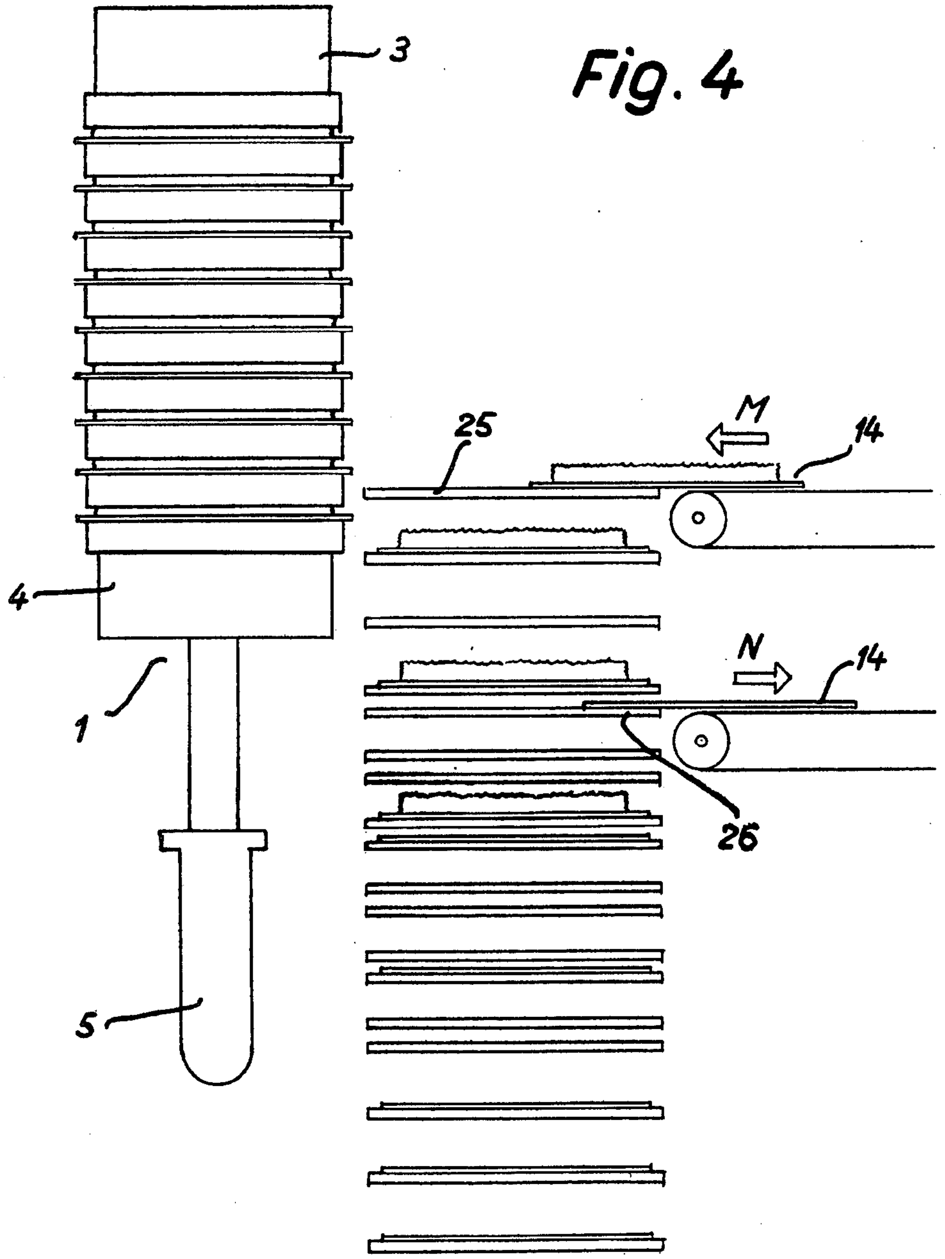

At the moment of operation shown in FIG. 3, the press 1 is already substantially closed. The cage 13 has been lowered two levels from the position shown in FIG. 2. A loaded caul 14 is now conducted onto that loading level whose level agrees with the level of the upper conveyor belt surface 18 (arrow K).

In addition an unloaded caul 14 is moved out of an unloading level and returned by the conveyor belt 20 to the forming station (arrow L).

After the end of the phase of operation shown in FIG. 3, a loaded caul, after corresponding lowering of the cage 13, is laid on the loading level which is next to the top and, at the same time, the unloaded caul is moved out of the unloading level which is next to the top. Thereupon the cage is lowered into the lowermost position shown in accordance with FIG. 4 so that it is now possible to conduct a loaded press tray 14 to the uppermost level 25 (arrow M) and to free the uppermost unloading level 26 from the caul 14 lying on it (arrow N).

After the termination of the phase which has just been described, the cage 13 is lifted in stepwise manner. Between two steps, which correspond in each case either to the height of two levels or to the height of one level, a loaded caul is in each cage pushed onto a loading level and at the same time a freed caul is removed from the cage. These processes are repeated until the condition shown in FIG. 1 has been reached again, at which time a full cycle has been completed.

The degree of interspersing in the first embodiment of the apparatus can easily be noted from the drawing. As a matter of fact, in the middle part of the cage a loading level and an unloading level in each case are combined to form a pair of levels. It is clear that the structural height of the cage 13 would be considerably greater without the interspersing of the levels effected in accordance with the invention. In order that the introduction of the mats into the press 1 is not impeded, it is seen to it that the distance between the output loading level surface and the lower surface of the unloading level arranged directly below it is not greater than the thickness of a plate 7 of the press.

The interengaging of the two sets of levels leads to another advantage, since it is possible, with a corresponding development of the drive and guide means of the cage 13, to effect a lowering to a level on which a defective mat lying on any loading level 25 can be removed by the conveyor belt 20 without being confronted by the necessity of making the pit 9 considerably deeper. In the example discussed, an additional pit depth which corresponds to the distance between the active courses of the two conveyor belts 18 and 20 is sufficient.

The plant in accordance with FIGS. 5 to 10 is for a smaller plant. It consists, essentially, of a forming station comprising two spreading places 27 and 28, a two-level press 29, a raisable and lowerable loading and unloading cage 30, a board removal cage (not shown), conveyor means (not shown) and the cauls 14. The interspersing of the loading and unloading levels is 100% in this case, i.e. an unloading level is located directly below each loading level. The passage of the cauls to the spreading points 27 and 28, the former of which spreads fine outer-layer material and the latter coarse center-layer material, and the return of the cauls loaded with mats take place on the same level. This results in the particular advantage that it is possible to manufacture a three-layer board with the use of merely two spreading points.

Figure 5:
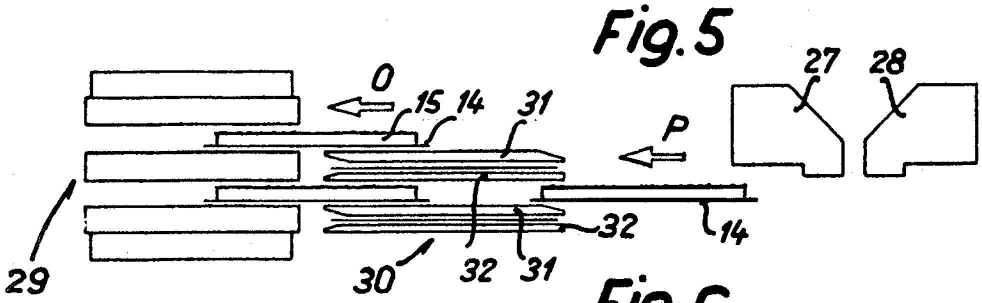

During a complete operating cycle the following processes take place:

In accordance with FIG. 5, the trays 14 loaded with mats 15 are introduced from the two loading levels 31 into the open press 29 (arrow O) and at the same moment the first mat of the following load is pushed onto the lower loading level (arrow P).

Figure 6:
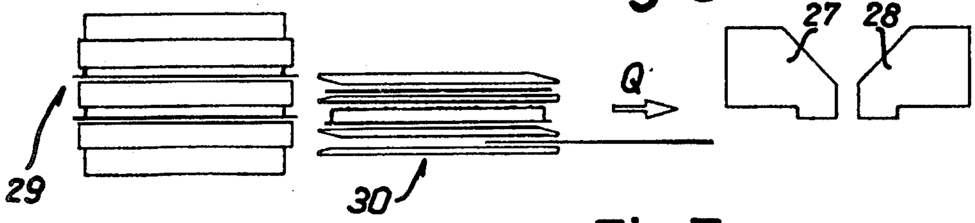

The cage is now lifted all the way (FIG. 6). The press is practically closed, and the free caul is guided out of the lower unloading level and fed to the spreading stations 27 and 28 (arrow Q).

Figure 7:
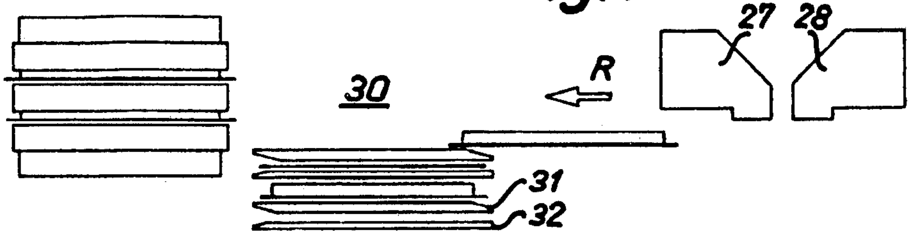

During the spreading process the cage 30 is lowered into the position shown in FIG. 7 so that the caul bearing the mat which has just been formed can be guided onto the upper loading level (arrow R).

Figure 8:
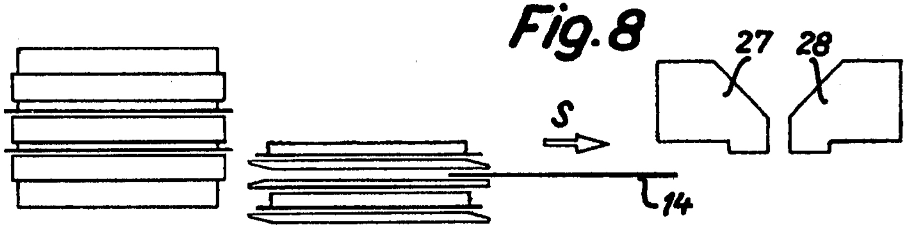

The cage is now raised to such an extent that the upper unloading level is located at the conveyor level, so that the free caul 14 present there can be pulled out (FIG. 8, arrow S).

Figure 9:
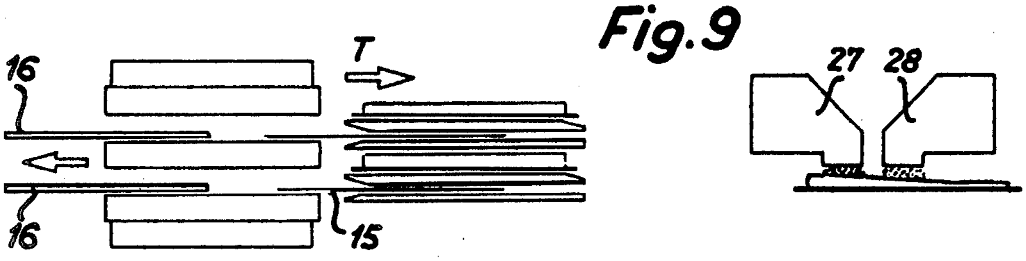
Figure 10:
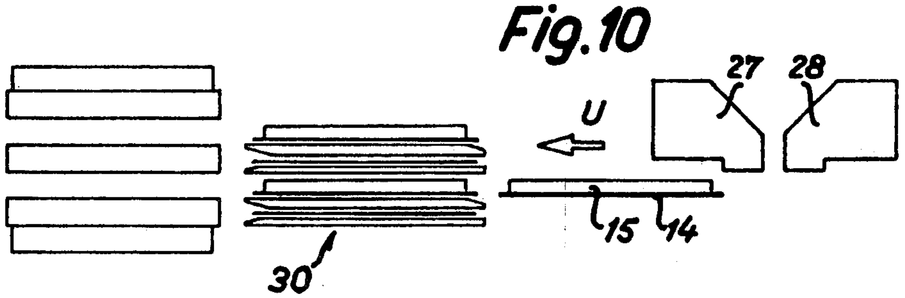

During the course of the phase shown in FIG. 9, the cauls freed from the compressed particle boards 16 are pushed onto the unloading levels (arrow T). Furthermore, below the spreading place a mat is produced and fed to the cage 30 (FIG. 10, arrow U). In this way the entire operating cycle which started in the phase shown in FIG. 5, is substantially complete.

In contradistinction to the first embodiment, in the case of the extremely compact design illustrated in FIGS. 5 to 10, no more than one caul can be present simultaneously outside of the pressing and loading section comprising the press 29 and the apparatus 30. The total number of cauls 14 depends on the number of pressing levels and in case of $n$ levels is equal to $2n + 1$. In the example there are five press trays.

It has been shown above that the advance in the art represented by the new device resides, inter alia, in the fact that loading levels can be filled and unloading levels freed of the press boards simultaneously. It is thus not possible to effect the loading of the press and the taking of the trays out of it with a conventional pushing or extraction arm. This problem is however of a secondary nature and does not afford any particular difficulties. Thus it is possible to arrange between the press and the apparatus of the invention a frame which is displaceable within narrow limits parallel to the direction of loading and the main plane of which is perpendicular to the direction of loading while its vertical parts bear drivable rollers by which the cauls lying in the press are grasped on both side edges and transported into the cage, while in a second position of the frame, and after suitable reversal of the direction of rotation of the rollers, the loaded cauls are conveyed from the cage into the open press.

Another variant of the displacement means is shown in FIGS. 11 to 14. In this construction, arms 35 are swingably attached to the frame of the cage 12. These arms bear shafts 36, each having two friction rollers 37. For the driving of the rollers 37, one pair of which is arranged above each level of the cage 12, use may be made of individual electric motors or else a drive means which is common to all levels.

Furthermore, two horizontal displaceable gripper arms 38, moved by drives not shown in the drawing, are associated with each level of the cage 12. On the free ends of these gripper arms there are seated U-shaped claws 39 which are intended to grasp corresponding hooks 40 of the cauls 14 and accordingly, upon suitable drive of the arms 38, make possible the pulling of the loaded cauls into the press or the pushing of the free cauls out of the press. The shape and arrangement in space of the claws 39 is so selected that upon every closing and opening of the press the interengagement of hooks and claws takes place at the correct moment.

Figure 11:
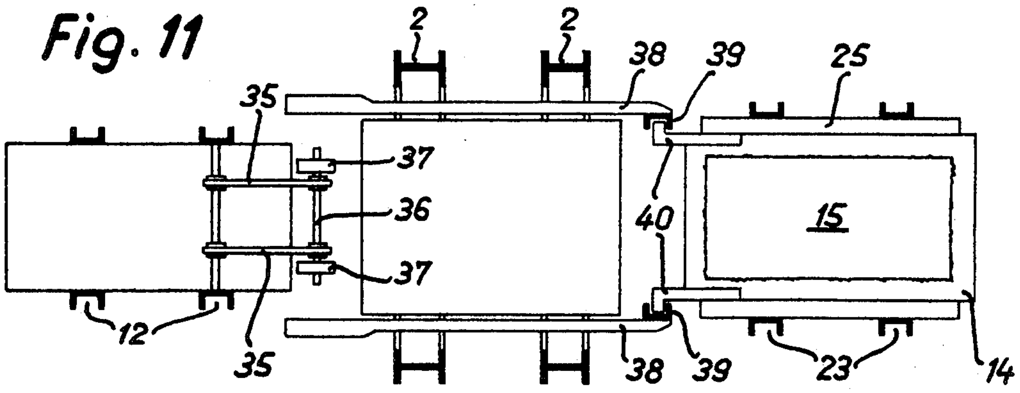
Figure 12:
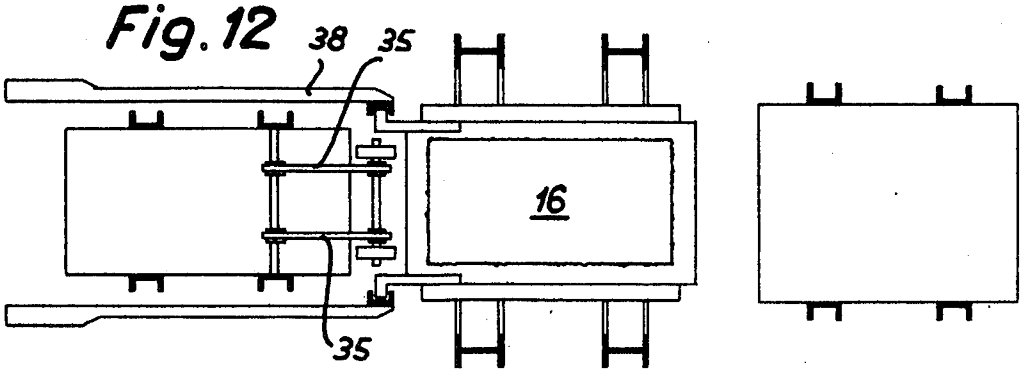
Figure 13:
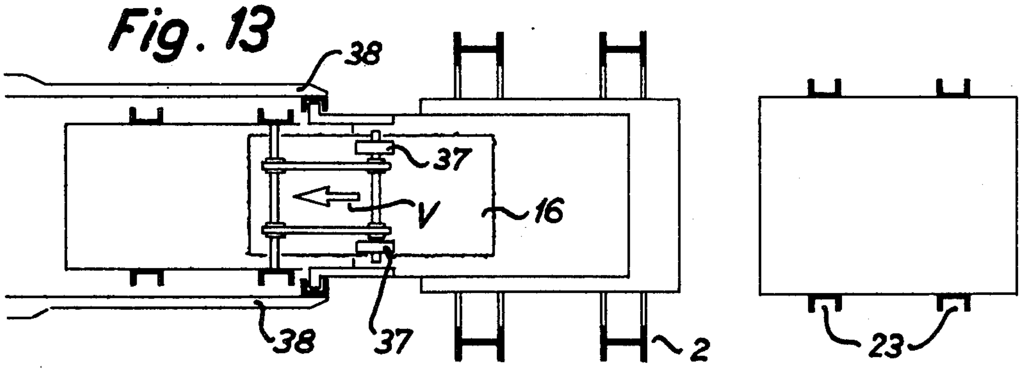
Figure 14:
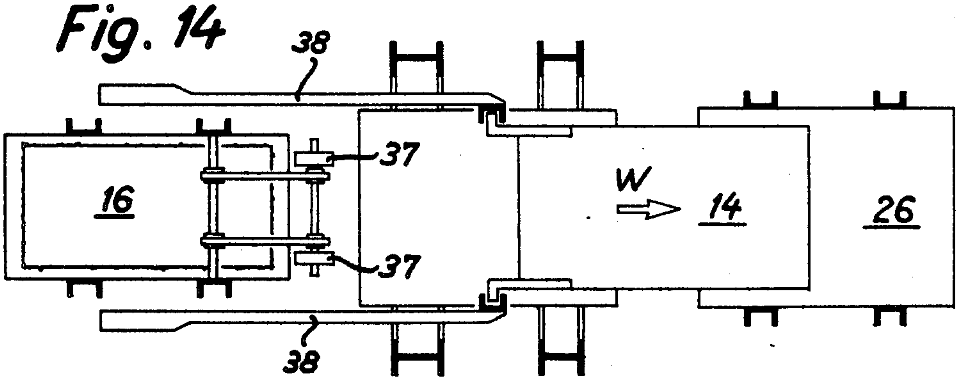

In the position shown in FIG. 11, a caul 14 lying on a loading level 25 and holding a mat 15 is connected by friction locking with the two arms 38. In the next phase, shown in FIG. 12, this caul together with the mat has been introduced into the open press. After completion of the pressing process, the arms 38 are withdrawn an additional amount, so that the friction rollers 37 which are now driven can grasp the pressed board 16 and convey it into the cage 12 (FIG. 13, arrow V). FIG. 14, finally, shows how the empty caul 14 is displaced out of the press onto an unloading level 26 of the cage 13 (arrow W).

What is claimed is:

1. A mat loading and press-tray unloading apparatus for a multi-level press having a plurality of plates for the manufacture of boards said apparatus comprising a raisable and lowerable structure; a set of loading and unloading levels connected to said raisable and lowerable structure, each set corresponding in number to the number of press levels whereby the press is loaded with mats on trays from the loading levels and whereby the unloading levels receive the empty trays; means for raising and lowering said structure, and means for feeding said levels; said loading and unloading levels being arranged one above another such that at one end of said structure at least two loading levels are directly adjacent to each other, at the other end of said structure at least two unloading levels are directly adjacent to each other, and at an intermediate portion of said structure at least one unloading level is disposed between two loading levels.

2. Apparatus according to claim 1 in which a conveyor line for the feeding of press trays loaded with mats is arranged above a conveyor line for the removal of the press trays, characterized by the fact that below the lowermost loading level there are at least three, but at most five, unloading levels and that above the uppermost unloading level there are a corresponding number of loading levels.

3. Apparatus according to claim 2, characterized by the fact that the uppermost loading level can be lowered to the level of the bottom conveyor line intended for the removal of the press trays in order to sort-out defective mats.

4. Apparatus according to claim 3, characterized by the fact that the distance between the upper loading level surface and the lower surface of the unloading level directly below same is not greater than the thickness of one plate of the multi-level press.

5. Apparatus according to claim 2, characterized by the fact that the distance between the upper loading level surface and the lower surface of the unloading level directly below same is not greater than the thickness of one plate of the multi-level press.

6. Apparatus according to claim 1, characterized by the fact that the lowermost loading and unloading levels can be swung within predetermined limits around an axis which is perpendicular to the axis of displacement of press trays and mats.

7. Apparatus according to claim 1, characterized by the fact that the distance between the upper loading level surface and the lower surface of the unloading level directly below same is not greater than the thickness of one plate of the multi-level press.

* * * * *